United States Patent
Schwenker

(10) Patent No.: US 6,817,300 B2
(45) Date of Patent: Nov. 16, 2004

(54) LOW PROFILE VEHICLE TURNTABLE

(76) Inventor: William V. Schwenker, 3795 Arroyo Sorrento Rd., San Diego, CA (US) 92130

( * ) Notice: Subject to any disclaimer, the term of this patent is extended or adjusted under 35 U.S.C. 154(b) by 78 days.

(21) Appl. No.: 10/308,094

(22) Filed: Dec. 3, 2002

(65) Prior Publication Data

US 2003/0101894 A1 Jun. 5, 2003

Related U.S. Application Data

(60) Provisional application No. 60/338,476, filed on Dec. 4, 2001.

(51) Int. Cl.[7] ............................................... B60S 13/02
(52) U.S. Cl. .............................. 104/44; 104/45; 52/65
(58) Field of Search ........................... 104/44, 45, 46, 104/35, 47, 43, 41; 52/65; 248/49, 349; 414/225, 228; 198/465.1, 465.2, 465.4

(56) References Cited

U.S. PATENT DOCUMENTS

| | | | |
|---|---|---|---|
| 2,952,221 A | * | 9/1960 | Hobel ............................ 104/41 |
| 3,566,798 A | * | 3/1971 | Peitzman ....................... 104/44 |
| 3,661,386 A | | 5/1972 | Green |
| 3,685,079 A | * | 8/1972 | Dawson ......................... 15/53.3 |
| 4,265,581 A | | 5/1981 | Ives |
| 4,498,398 A | * | 2/1985 | Vallee ........................... 104/44 |
| 4,608,929 A | | 9/1986 | Park |
| 4,753,173 A | | 6/1988 | James |
| 4,777,884 A | | 10/1988 | Seay |
| 4,796,537 A | | 1/1989 | Besser |
| 5,086,704 A | | 2/1992 | Mueller |
| 5,090,508 A | | 2/1992 | Nishikawa |
| 5,538,357 A | | 7/1996 | Boswell |
| 5,626,079 A | | 5/1997 | Summers |
| 5,755,160 A | | 5/1998 | Blufordcraving |
| 6,123,310 A | | 9/2000 | Paskiewicz |
| 6,328,106 B1 | | 12/2001 | Knight |

* cited by examiner

Primary Examiner—Frantz F. Jules
(74) Attorney, Agent, or Firm—McGahey & McGahey, A.P.L.C.; Harry McGahey

(57) ABSTRACT

A low profile turntable device for parking or maneuvering vehicles or heavy items in confined spaces constructed of two skins with structural foam in between, support rollers on the bottom skin, stops on the bottom skin to stabilize the turntable during loading, a reversible drive mechanism, and a ramp around the exterior so it does not have to be installed below grade level.

23 Claims, 11 Drawing Sheets

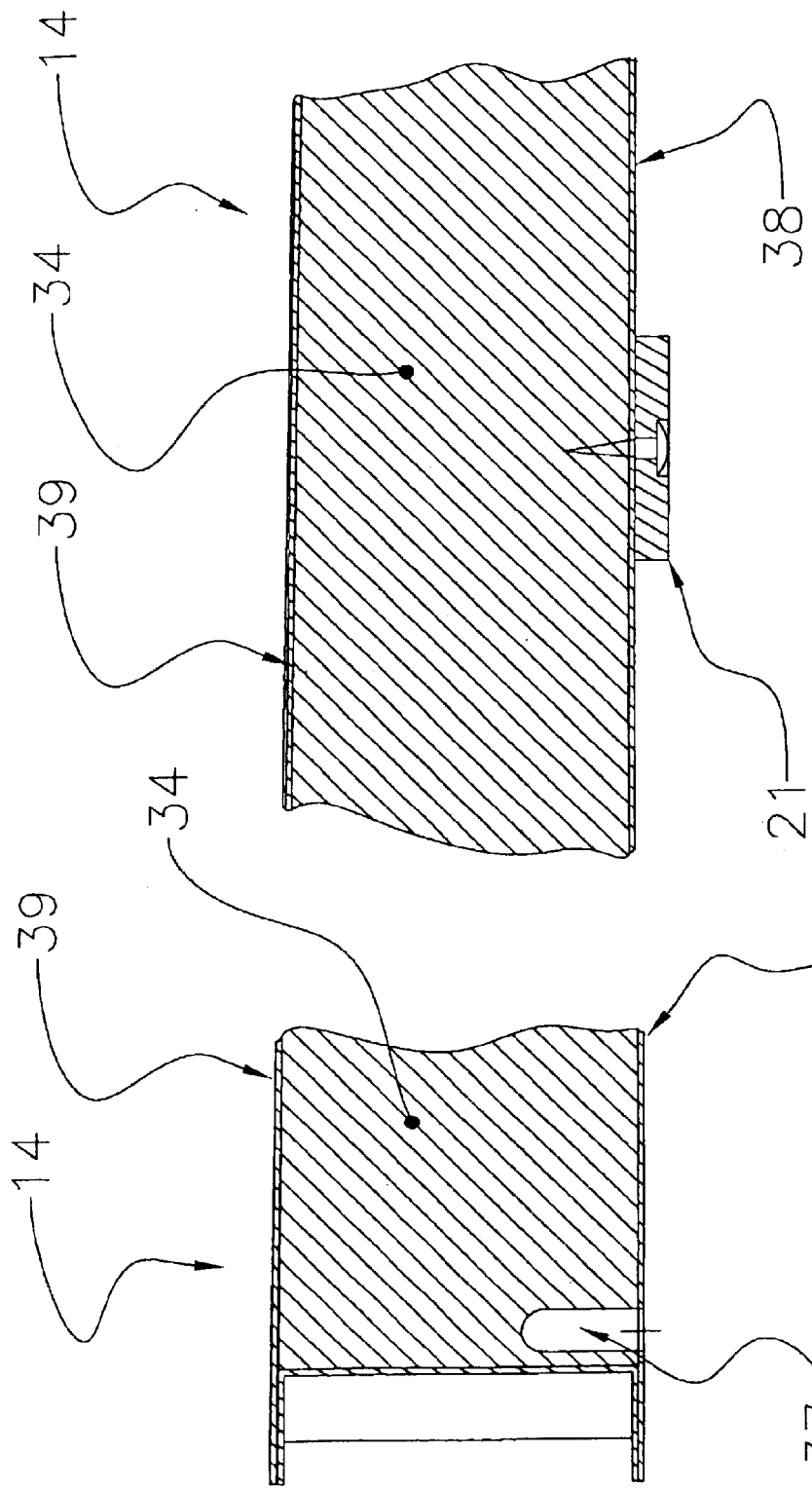

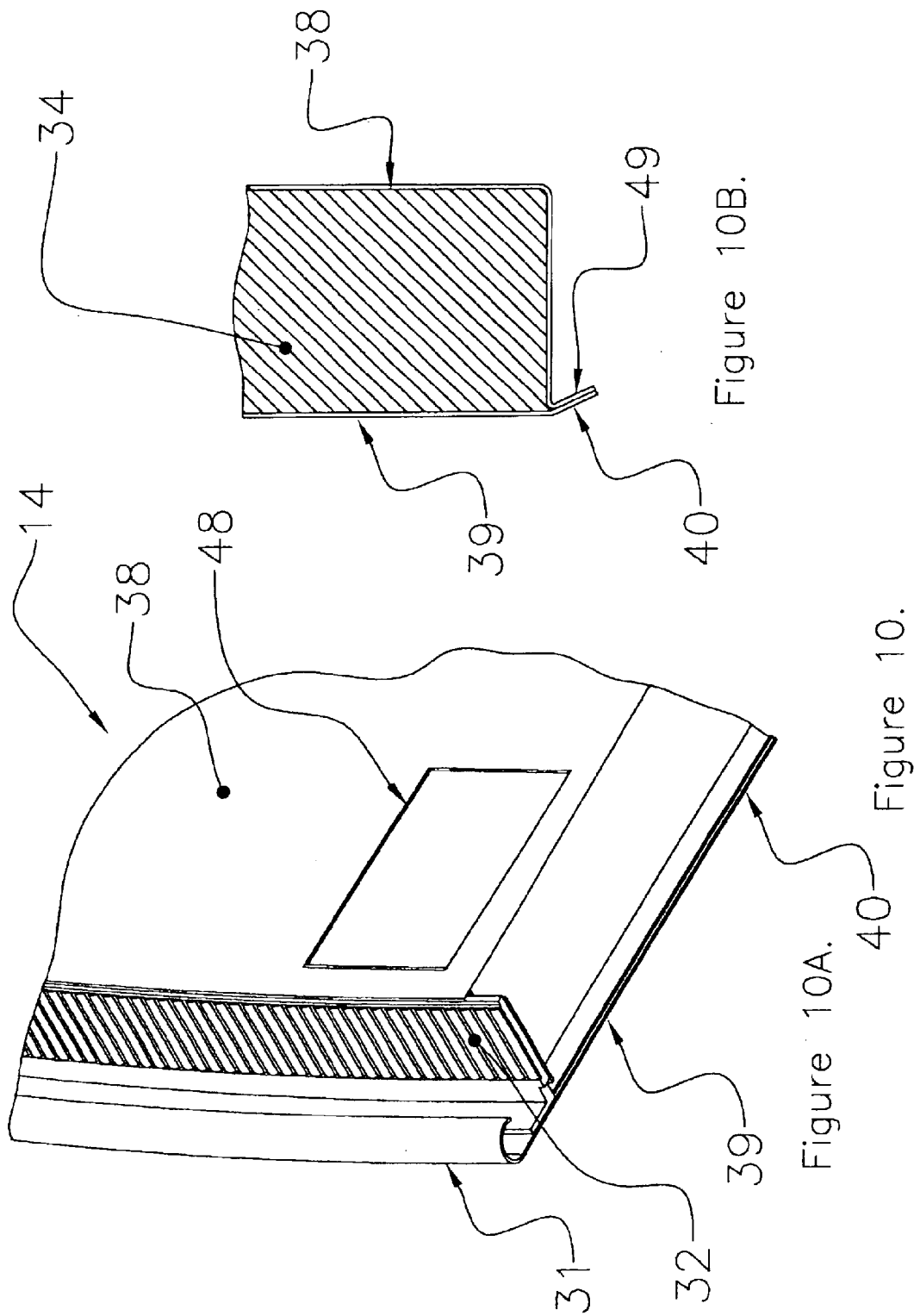

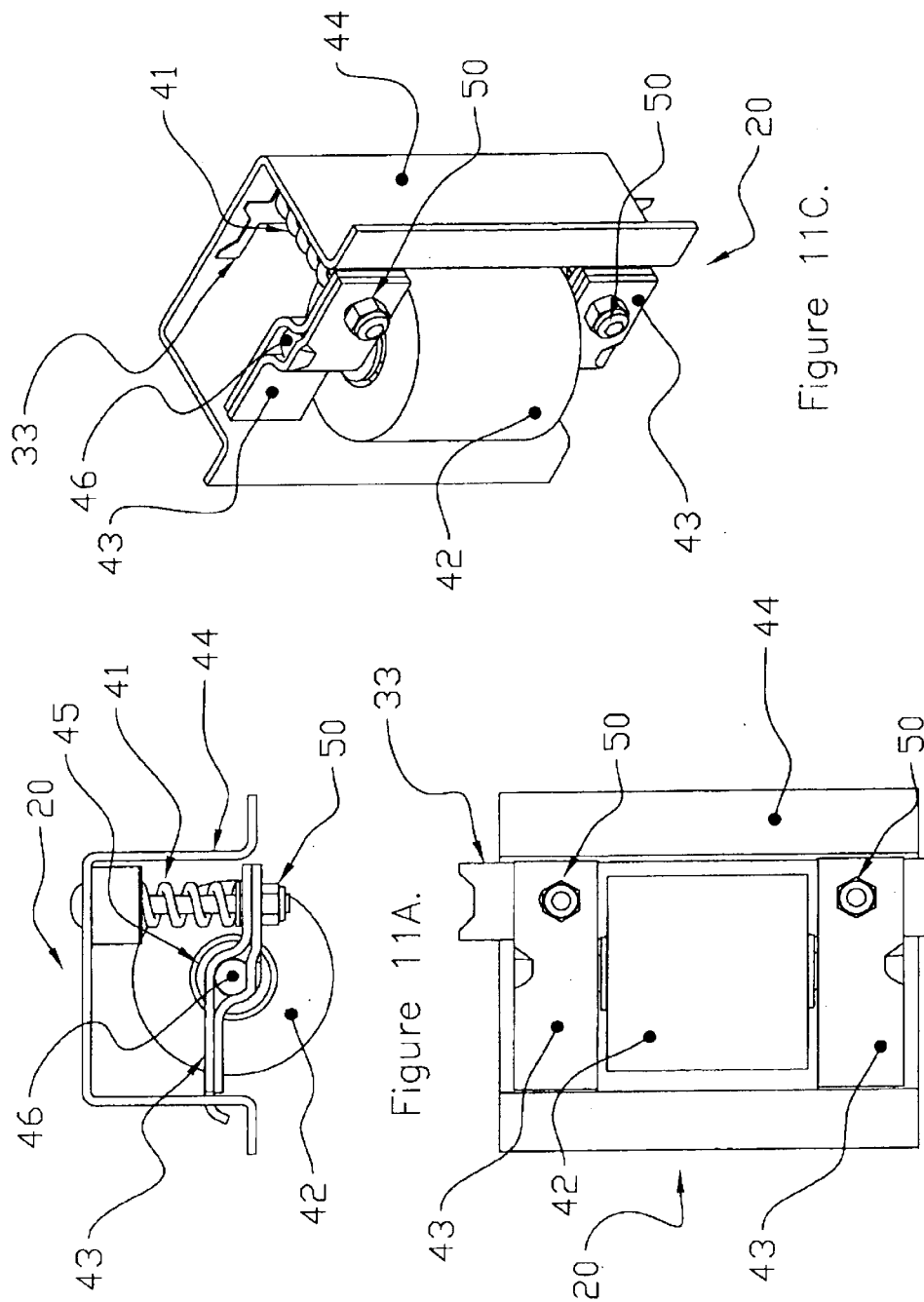

LOW PROFILE VEHICLE TURNTABLE

CROSS REFERENCE

This application is entitled to the benefit of the U.S. provisional patent application No. 60/338,476 filed Dec. 4, 2001 with the United States Patent Office.

No Federal money or grant was used in the development of this invention.

The present invention is comprised of a low profile reversible drive turntable which can be anchored to an existing smooth, flat surface with minimal preparation. The invention allows automobiles, light vehicles or heavy items to be parked and maneuvered in a very small area The invention provides convenience and safety in very small areas where a vehicle would otherwise not be able to easily park or a bulky object would not be able to maneuver. The improvements over existing designs include allowing a very low profile so a below ground installation is not required, a system of stops which anchor the turntable and prevent it's movement while vehicles are loading and unloading, and a structural foam construction which is inexpensive but superior to current designs.

BACKGROUND OF THE INVENTION

There is a need for an inexpensive, easily installed turntable which does not require extensive installation work. Previously patented vehicle and heavy item turntables tend to be complicated mechanically, expensive to manufacture, and often require extensive installation and site modifications during the installation process. This invention has the advantage of being inexpensive, only needing a flat surface area sufficient to accommodate the turntable itself, and a sufficiently firm flat surface to which the invention can be affixed, in order to be operable. This invention therefore results in a substantial savings on equipment cost, installation time and labor expense.

LIMITATIONS OF PRIOR ART

Historical attempts to address some or all of the above limitations in prior patented machines have been numerous. Some examples of prior art include:

U.S. Pat. No. 3,566,798, Mar. 2, 1971, Peitzman, is an automobile turntable which must be installed flush with the surface where it is to be used. This requires expensive excavation and preparation during the installation process. The subject invention avoids the expense and time of excavation and installation at ground level because it is designed to sit upon any flat surface without having to be installed below ground lever.

U.S. Pat. No. 4,498,398, Feb. 12, 1985, Vallee, is a portable turntable designed to be easily moved. The current invention is designed for more permanent installations such as in residential units, and the construction is simpler, less complex, and less expensive to install than the Vallee invention.

U.S. Pat. No. 4,608,929, Sep. 2, 1986, Park, requires a subsurface installation and therefore requires preparation and excavation of the surface it sits on.

U.S. Pat. No. 4,753,173, Jun. 28, 1988, James, uses a cantilever design for strength on the platform, requires complicated guide bearing construction, and spoke like members to support the upper deck of the turntable, while the current invention uses sections filled with structural foam giving greater strength and a more uniform upper surface, while decreasing installation complexity and costs.

U.S. Pat. No. 4,777,884, Oct. 18, 1988, Seay, must be installed below ground, a feature increasing cost of installation avoided by the current invention.

U.S. Pat. No. 4,796,537, Jan. 10, 1993, Besser, is a mobile truck turntable having a scow like body with a high vertical profile designed for portable use to move heady trucks. The subject invention has the advantage of being much lower to the ground, and being designed for permanent installation, has a very low profile.

U.S. Pat. No. 5,086,704, Feb. 11, 1992, Mueller, uses a polygonal support frame, but still must be installed with a portion of itself below ground, a problem which the current invention solves.

U.S. Pat. No. 5,090,508, Feb. 25, 1992, Nishikawa et. al., is a turntable with a retractable lift. It is designed for repairing of automobiles and has extensive and more expensive components as part of it's structure so that it can lift an automobile horizontally. The subject invention avoids the expense and complicated machinery as it does not attempt to raise it's load vertically.

U.S. Pat. No. 5,538,357, Jul. 23, 2000, Boswell, consists of a turntable requiring very powerful motors that can left a vehicle vertically as well as rotate the turntable. The installation required extensive work in the area to be installed. The subject invention does not require such expense as powerful motors since the drive mechanism only rotates a turntable in the horizontal axis. A ⅓ horsepower motor is all that is necessary for the current invention.

U.S. Pat. No. 5,626,079, May 6, 1997, Summers, is a patent for an oscillating turntable for displaying vehicles. It differs from the subject invention because it consists of two vertical tiers of counter rotating turntables, lending to a complexity and expense avoided by the subject invention.

U.S. Pat. No. 5,755,160, May 26, 1998, Blufordcraving, is a rotating floor for automobiles but it also has similar disadvantages as the Summer U.S. Pat. No. 5,626,079. It must be installed below ground level, and it requires powerful motors to rotate it. The Subject invention sits on top of any flat ground surface, and the drive mechanism location is such that very little power is required to actually rotate the turntable.

U.S. Pat. No. 6,123,310, Jun. 19, 1998, Paskiewicz, is not a permanent turntable designed for residential use of automobiles, but instead is a castor based platform for maneuvering and storing large numbers of motorcycles and other two wheeled vehicles.

U.S. Pat. No. 6,382,106, May 7, 2002, Knight, uses tubular construction which makes the turntable high and necessitates a below ground construction. The current invention avoids the problems inherent in having to install some of the components underground.

SUMMARY OF THE INVENTION

The invention consists of a device for parking or maneuvering vehicles or heavy items in confined spaces, a low profile turntable on a center pivot, riding on support rollers, with stops near the center of rotation, with a ramp around the exterior, is driven by a reversible drive mechanism driving the turntable by a mechanical means such as a chain drive, gear or friction wheel etc.

BRIEF DESCRIPTION OF THE DRAWINGS

FIG. 9A illustrates a sectional view of the center part of the wedge shaped panel section with the alignment hole.

FIG. 9B illustrates a sectional view of the installation of a typical stop in the bottom of a wedged shape section.

FIG. 10A illustrates a bottom view of the lower edge of a wedge shaped panel section with the corrugated edge and the installed wheel.

FIG. 10B illustrates a sectional view of the mating edge of a wedge shaped panel section.

FIG. 11A illustrates a sectional side view of a typical roller module.

FIG. 11B illustrates a bottom view of a typical roller module.

FIG. 11C illustrates an isometric view of typical roller module.

DETAILED DESCRIPTION

Figure 1:
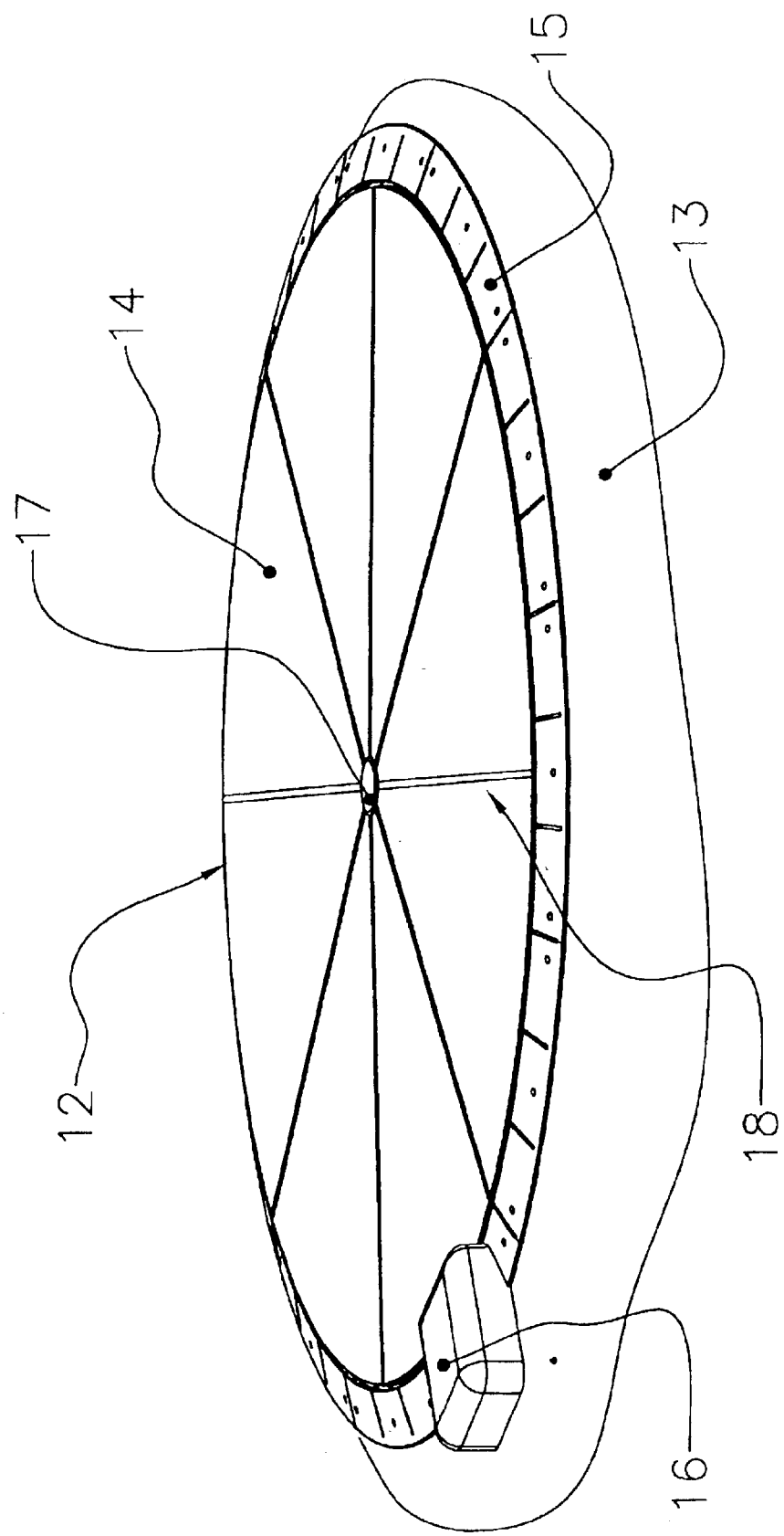
FIG. 1 illustrates an isometric view of the turntable device embodying various features of the invention as it would be installed.

In FIG. 1, a circular turntable indicated generally at (12), consisting of a number of adjacently assembled wedge shaped panel sections (14), acts as the turntable and automobile support. The embodiment shown is made of steel and uses eight wedge shaped panel sections but less could be used if the wedge shaped panel sections were made of extruded plastic, and more could be used if a lower strength material was used. A ramp section (15) adjacent to the perimeter of each wedge shaped panel section surrounds the turntable and is bolted to the flat concrete or composite driveway, garage or display surface (13). The turntable assembly (12) is attached to the ground at it's center by a center bearing and covered by a center bearing cover (17).

Figure 2:
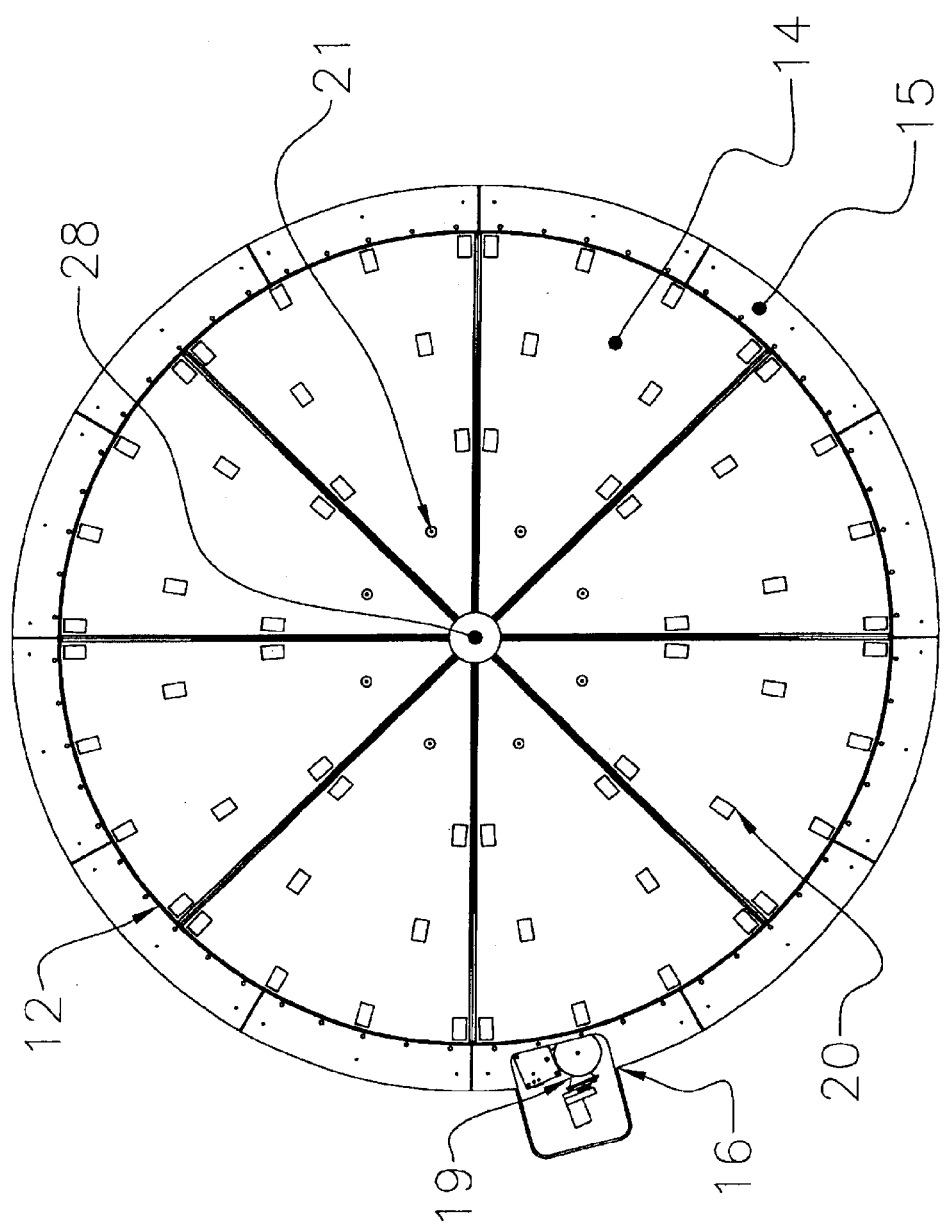
FIG. 2 illustrates a bottom plan view of the turntable showing it's main components.

In FIG. 2, the area of the turntable indicated generally at (12) radiating outward from the center bearing (28) is supported by multiple support roller modules (20) spaced regularly underneath the turntable surface so as to provide support for the heavy vehicles above. These support rollers are oriented to roll in the direction in which the turntable moves. Each wedge shaped panel section (14) contains a stop (21) made of a firm resilient material such as high density polyethylene which is anchored to the bottom of the turntable panel sections (14) near the center so that the center of the turntable is supported by these stops (21) as a vehicle is driven on and off. A reversible drive mechanism means (19) covered by a motor housing (16) drives the turntable by a mechanical contact with the outer surface of the turntable wedge shaped panel sections (14).

Figure 3:
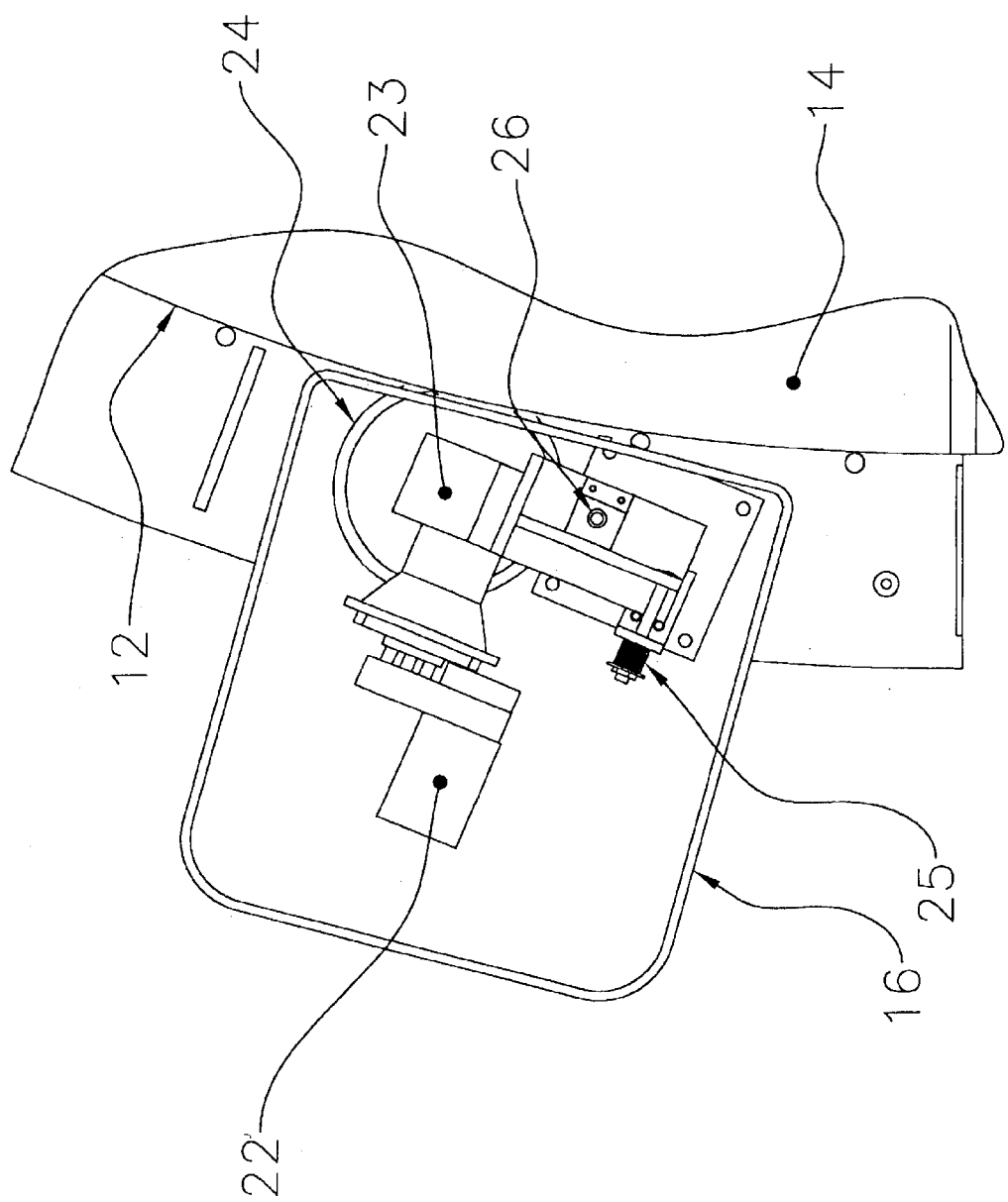
FIG. 3 illustrates a top view of the turntable drive system with the cover removed showing the best embodiment currently known for the drive mechanism.

In FIG. 3, the motor drive assembly illustrates the drive motor (22) rotating the gearbox means (23) which rotates the rubber coated drive wheel (24) engaging the perimeter of the turntable (12). The current embodiment shown uses an electric motor of at least ⅓ horsepower. A spring tensioner (25) applies force to the motor pivot support mechanism (26) so as to press the rubber coated drive wheel (24) against the perimeter of the turntable (12). In the embodiment shown, the motor does not disengage, but a system could easily be built which did engage and disengage the motor as required. The entire motor drive assembly is covered by a motor housing (16) to protect it from the weather and corrosion. The drive mechanism can be operated by remote control, or by a sensing switch system built to detect the presence of a load evenly distributed upon it. The drive mechanism allows the turntable to rotate continuously in either direction.

Figure 4:
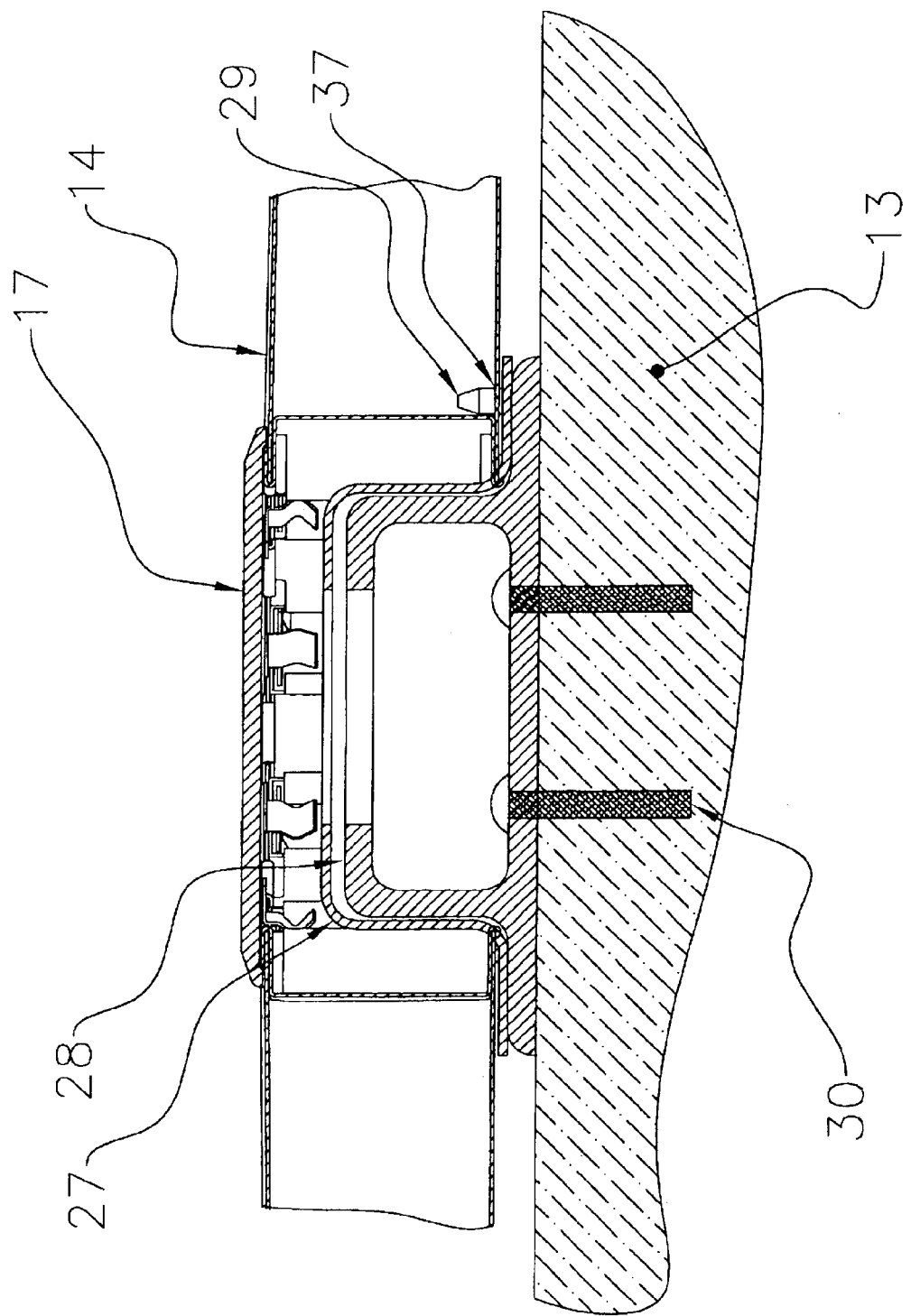
FIG. 4 illustrates a sectional view of the center bearing of the turntable showing the center bearing attached to the ground and the center pivot supporting the panel sections.

In FIG. 4, the center bearing mechanism illustrated generally by the center bearing (28) which is anchored into the surface of the driveway or composite surface (13) using concrete mounting bolts (30) as shown. The center bearing support is made from a low friction plastic material to act as a bearing surface. The center bearing (28) supports a rotating center bearing (27) with locating pins (29) that interface with the locating holes (37) on the narrow end of each wedge shaped panel section (14). The turntable (12) is attached to the center bearing (28) in such a manner as to allow the turntable to rotate continuously or a specific amount in either direction. The center bearing mechanism is covered by a center bearing cover (17) as shown to protect it from debris.

Figure 5:
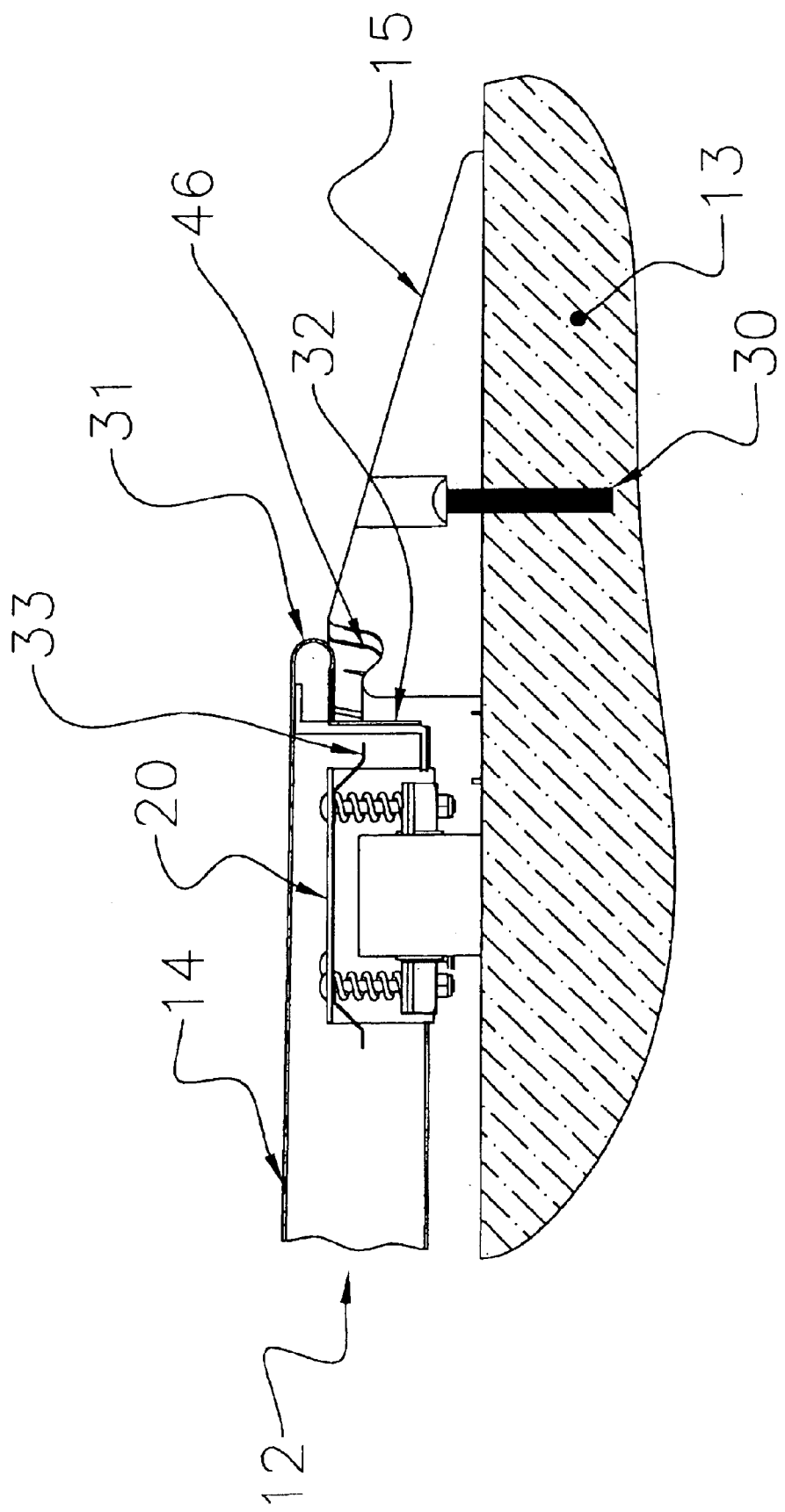
FIG. 5 illustrates a sectional view of the ramp providing access to the turntable.

FIG. 5 illustrates that the circular ramp sections (15) around the circumference of the turntable are anchored by concrete anchor bolts (30) to the ground surface (13). The ramp allows the vehicle to be driven up onto the turntable without the turntable having to be installed below ground level. In the embodiment shown, each part of the circular ramp section (15) contains a depression (46) which is overhung by the turntable lip (31) which directs water away from the underside of the turntable (12) and keeps debris from infiltrating under the panels. The turntable lip (31) is a continuous part of the upper side of the wedge shaped panel section (14). The outer perimeter circumference (32) of the panel sections (14) is corrugated and is the surface the drive wheel presses and rotates against. Attached to, and protruding from the bottom of the wedge shaped panel section is the roller support assembly (20) which is held in place by a retaining clip (33). Panel sections are located by the guide pin and are held in place by gravity and by being fastened to adjoining panel sections. The turntable is designed to sit on a flat hard surface. If desired, an unsuitable surface can be modified by installing a sheet metal skin or similar cover over the area where the turntable is to be installed.

Figure 6:
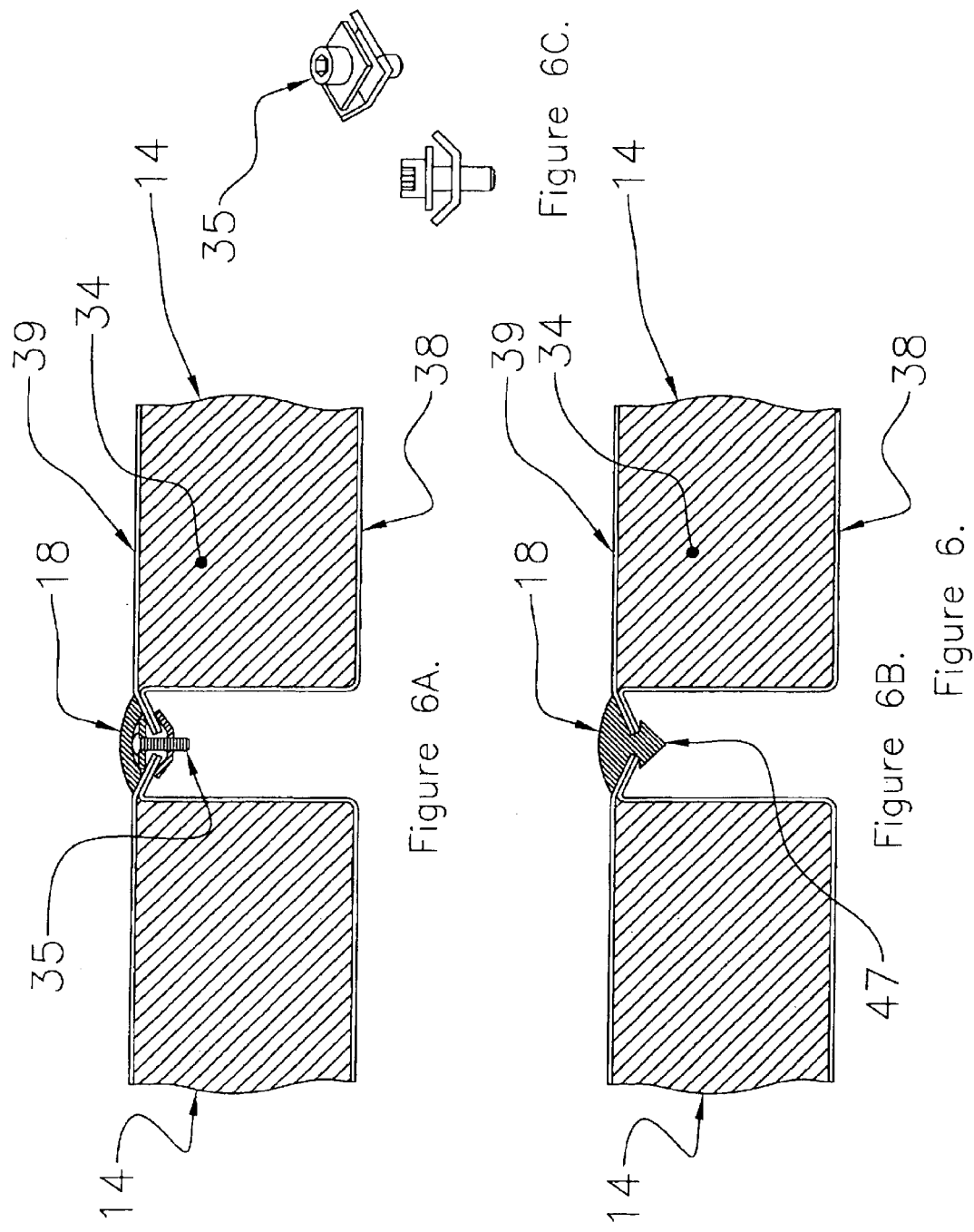
FIG. 6A illustrates a sectional view of how the clips fasten adjoining pie shaped panel sections together.
FIG. 6B illustrates a sectional view of the rubber joint seal between the panel sections of the turntable.
FIG. 6C illustrates an isometric view of an attachment clip which can be used to fasten adjoining wedge shaped panel sections.

FIG. 6A illustrates a section view of a typical wedge shaped panel section (14) being fastened to an adjoining wedge shaped panel section (14) using an attachment clip (35) covered by a panel joint sealing rubber seal (18) formed of extruded rubber material. This seal should have a notch in it wherever it passes over a rubber grommet (18) sealing the joints as illustrated in FIG. 6B. The top and bottom skin of the wedge shaped panel section is separated by a polyurethane foam filler (34) inside it. Any structural foam filler could be used. The embodiment shown uses a polyurethane weighing 6 pounds per cubic foot, but any structural foam such as polyurethane or polyethylene weighing from 4 to 10 pounds per cubic foot could be used.

FIG. 6B illustrates in a section view the rubber grommet (18) which seals the joint between each wedge shaped panel section (14) in areas between the attachment clips (35) showing the tab (47) that holds it in place.

Figure 7:
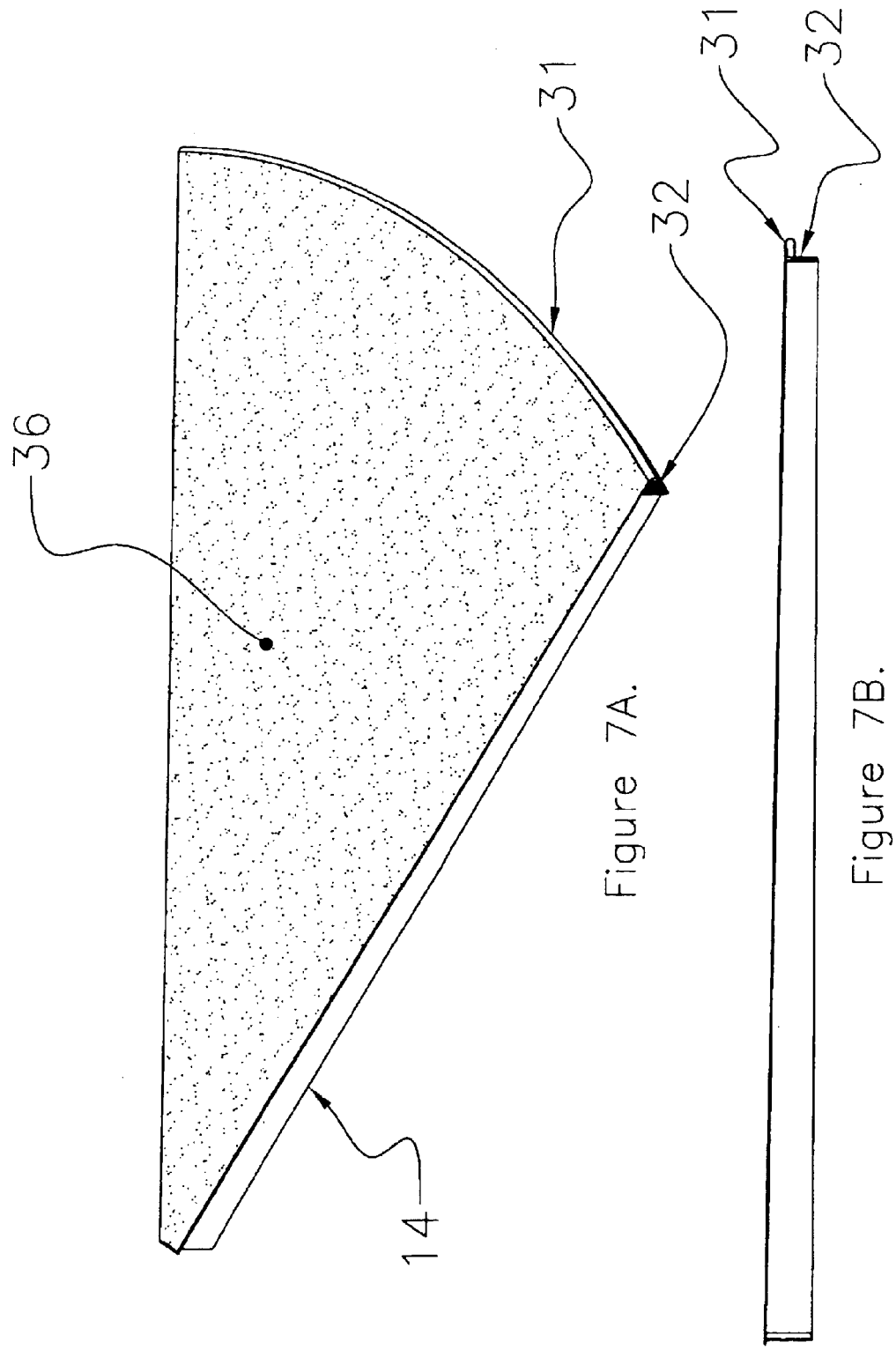
FIG. 7A illustrates an isometric view of a wedge shaped panel section.
FIG. 7B illustrates a side view of a wedge shaped panel section showing the raised center to promote water drainage.

FIG. 7A illustrates an isometric view of an assembled wedge shaped panel section (14) with a non-slip coating (36) on the upper panel section. Such a coating can be rubberized urethane, grit embedded in epoxy paint or any other wear resistant non-slip coating.

FIG. 7B illustrates a side view of an assembled wedge shaped panel section with the turntable lip (31) on the upper surface (36) and the corrugated outer circumference (32) of an assembled wedge shaped panel section.

Figure 8:
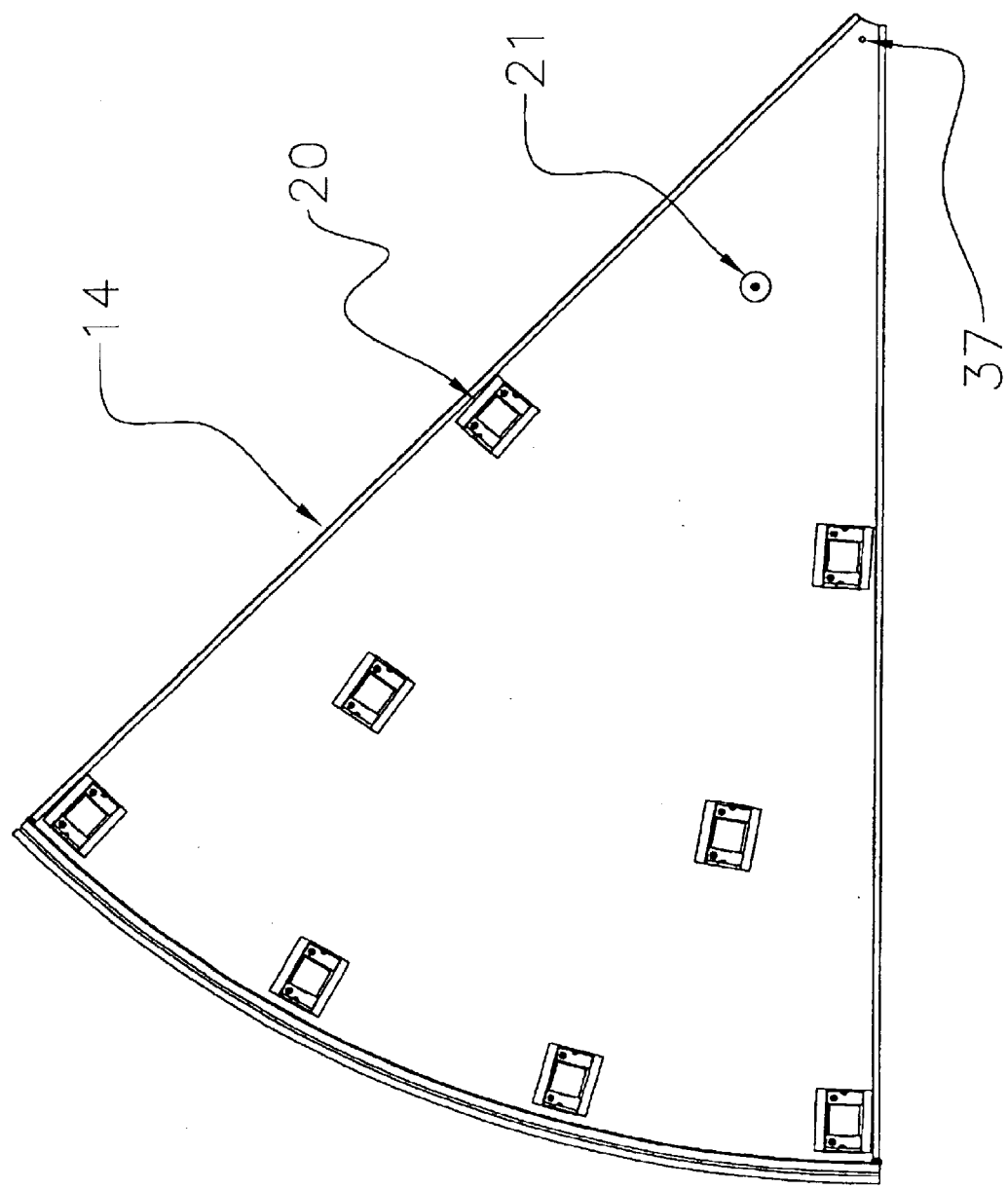
FIG. 8 illustrates a bottom view of a wedge shaped panel section showing the rollers and a stop installed.

FIG. 8 illustrates a bottom plan view of the bottom of an assembled wedge shaped panel section (14) showing a number of evenly spaced roller modules (20) and the stop (21) near the narrow end of the panel section. The stop contacts the ground surface and stabilizes the turntable as a load is driven across it and the weight is not distributed evenly. The embodiment shown uses eight rollers on each wedge shaped panel section, but using more or less between seven and twelve in number would also work. Even more could be added for an extremely large turntable. Also shown is the alignment hole (37) that mates with the alignment pin (29) shown in FIG. 4.

FIG. 9A illustrates a section view of the narrow part of the wedge shaped panel section (14) showing the alignment locating pin hole (37) and the location of the structural foam (34).

FIG. 9B illustrates a section view of the installation of a stop (21) to the bottom skin (38) of a wedge shaped panel section (14) into the polyurethane foam (34) installed underneath the top skin (39) of the wedge shaped panel assembly (14). The stop can be installed with any attachment means such as a truss-head sheet metal screw.

FIG. 10A illustrates a isometric cutout view of a lower corner of a wedge shaped panel section showing the corrugated edge (32), the turn table lip (31), the panel section joint (40) and the roller support opening (48).

FIG. 10B illustrates the mating edge of a wedge shaped panel section showing the flange joint (40) that is formed on the upper skin (39) and mechanically attached by welding, bonding or mechanically fastening it to the flange joint (49) that is formed onto the lower skin (38) of the panel section. The composite flange made up of the upper skin flange (40) and by the lower skin flange (49) is used in mating the wedge shaped panels sections together as shown in FIG. 6A. The upper skin (39) and lower skin (38) are separated by the structural foam (34) forming a strong stiff panel section.

FIG. 11A illustrates a side view of a roller module (20) illustrating the roller (42) supported by the bearing (45) mounted on the support shaft (46) fastened to the roller support bracket (43) mounted in the roller housing (44). The roller support brackets (43) are then supported by the roller support springs. (41) and held in place by fasteners (50) such as an ordinary carriage bolt. The roller support springs (41) distribute the load placed on top of the turntable over the entire turntable upper surface so one roller does not have to support a disproportionate part of the load upon it. The springs supporting the rollers also allow the turntable to be adapted to a less than level surface.

FIG. 11B illustrates a bottom view of a roller module (20) illustrating that there are two roller support brackets (43) held in place by the fasteners (50) supporting the roller (42) in the roller housing (44). Also shown is the retaining clip (33) that extends out both sides of the roller module (20) FIG. 11C shows how this clip is held in by the roller support springs.

FIG. 11C illustrates an isometric view of the roller module (20) showing the roller (42) suspended by a roller support axle (46) connected to two support brackets (43), which pivots on one side in a slot in the roller housing (44) and are supported on the other side by the roller support springs (41) which are anchored to the roller assembly housing (44) with fasteners (50) The retaining clip (33) is sandwiched between the roller support springs (41) and the roller housing (44) to hold it in place.

I claim:

1. A low profile turntable device for parking or maneuvering vehicles or heavy items in confined spaces, comprising:
   a. a turntable comprised of a plurality of sections, each section being constructed of a circular top and bottom skin with a layer of structural foam in between;
   b. the bottom skin riding on a plurality of support rollers installed within it;
   c. suspension springs attached to the rollers;
   d. a stop on each bottom skin;
   e. a ramp around the exterior of the turntable;
   f. a reversible drive mechanism to rotate the turntable continuously in either direction;
   g. an electrical switching control means to start, stop and reverse the drive mechanism;
   h. a source of power means to operate the reversible drive mechanism.

2. The device in claim 1 wherein:
   a. the turntable consists of a plurality of wedge shaped sections comprised of a top and bottom wedge shaped skin with a layer of structural foam in between;
   b. each wedge shaped section joined to a neighboring wedge shaped section so as to form a circle;
   c. the circle of wedge shaped sections joined at the center point by a connector means to form a central pivot point;
   d. the central pivot point supported by a bearing means to allow the circle of wedge shaped sections to rotate continuously in either direction;
   e. the rollers attached to the bottom of each wedge shaped section comprising a rolling means supported by a friction reducing bearing means supported by a suspension spring means;
   f. a stop installed on the bottom of each wedge shaped section;
   g. a corrugation element attached to the outside circumference of the perimeter of the circle of wedge shaped sections;
   h. a reversible drive means in contact with the corrugation element along the outside circumference of the circle of wedge shaped sections so that the circle can be rotated continuously in either direction;
   i. a circular bevel edged ramp adjacent to the outside of the circle of wedged shaped sections to allow the vehicles to be driven up onto the circle of wedge shaped sections.

3. The device in claim 2 wherein each wedge shaped section is made of steel.

4. The device in claim 2 wherein the foam means sandwiched between the top and bottom skins of each wedge shaped section consists of a structural polyurethane foam.

5. The device in claim 2 wherein the top section of each wedge shaped piece has a non skid coating on the top.

6. The device in claim 2 wherein each roller means consists of a roller supported through the longitudinal axis by an axle connected on each side to a friction reducing bearing means mounted in a support connected to a high strength suspension spring means.

7. The device in claim 2 wherein the reversible drive mechanism consists of an electric motor connected by a gear box to a rubber drive wheel in contact with the corrugated rim of the outer circumference of the circle of wedge shaped sections, and a spring tensioned pivot mechanism to keep the rubber drive wheel in contact with the corrugated rim of the wedge shaped sections.

8. The device in claim 2 further comprising a remote control mechanism means being used to actuate the motor and turn the wedge shaped sections.

9. The device in claim 2 further comprising an attached lip on the outer circumference of each wedge shaped section which extends over the gap between the wedge shaped section and the beveled ramp around the circle so as to prevent the entry of debris into the turntable interior.

10. The device in claim 2 further comprising reflectors being placed flush along the circumference of the beveled ramp to allow oncoming vehicles to see it easily during the day or night.

11. The device in claim 2 further comprising alternating flashing electrical lamps placed flush along the circumference of the beveled ramp to allow oncoming vehicles to see it easily during the day or night.

12. The device in claim 2 further comprising an electrical switching means being used to operate the turntable by a magnetically activated switch such that when a vehicle containing a substantial amount of magnetic material is placed upon the turntable, it activates the switch to cause the turntable to rotate the desired number of degrees.

13. The device in claim 2 wherein the electrical switching means used to operate the turntable is a magnetically activated switch such that when a vehicle containing a substantial amount of magnetic material is placed upon the turntable, it activates the switch to cause the turntable to rotate the desired number of degrees first in one direction and the next time it is operated in the reverse direction an equal number of degrees.

14. The device in claim 2 wherein the wedge shaped sections are manufactured of rotationally molded thermoplastic.

15. The device in claim 2 wherein the wedge shaped sections are manufactured of molded carbon fibers.

16. The device in claim 2 wherein the circular shape of the turntable is composed of eight sections.

17. The device in claim 2 wherein the circular shape of the turntable is composed of six or twelve sections.

18. The device in claim 2 wherein each wedge shaped section is joined to a neighboring wedge shaped section on each side by a flange emanating from the side of each wedge shaped section.

19. The device in claim 2 wherein each wedge shaped section is joined to a neighboring wedge shaped section on each side by a flange emanating from the top skin of each wedge shaped section.

20. The device in claim 2 wherein each wedge shaped section is joined to a neighboring wedge shaped section on each side by a flange emanating from the bottom skin of each wedge shaped section.

21. The device in claim 2 wherein the center point connector for each wedge shaped section consists of a low friction plastic material.

22. The device in claim 2 wherein each stop in the bottom skin of each wedge shaped section are attached in near proximity to the narrow end of the wedge shaped section.

23. The device in claim 2 wherein each stop in the bottom skin of each wedge shaped section are attached in near proximity to the outside perimeter end of the wedge shaped section.

* * * * *